Patented Feb. 10, 1931

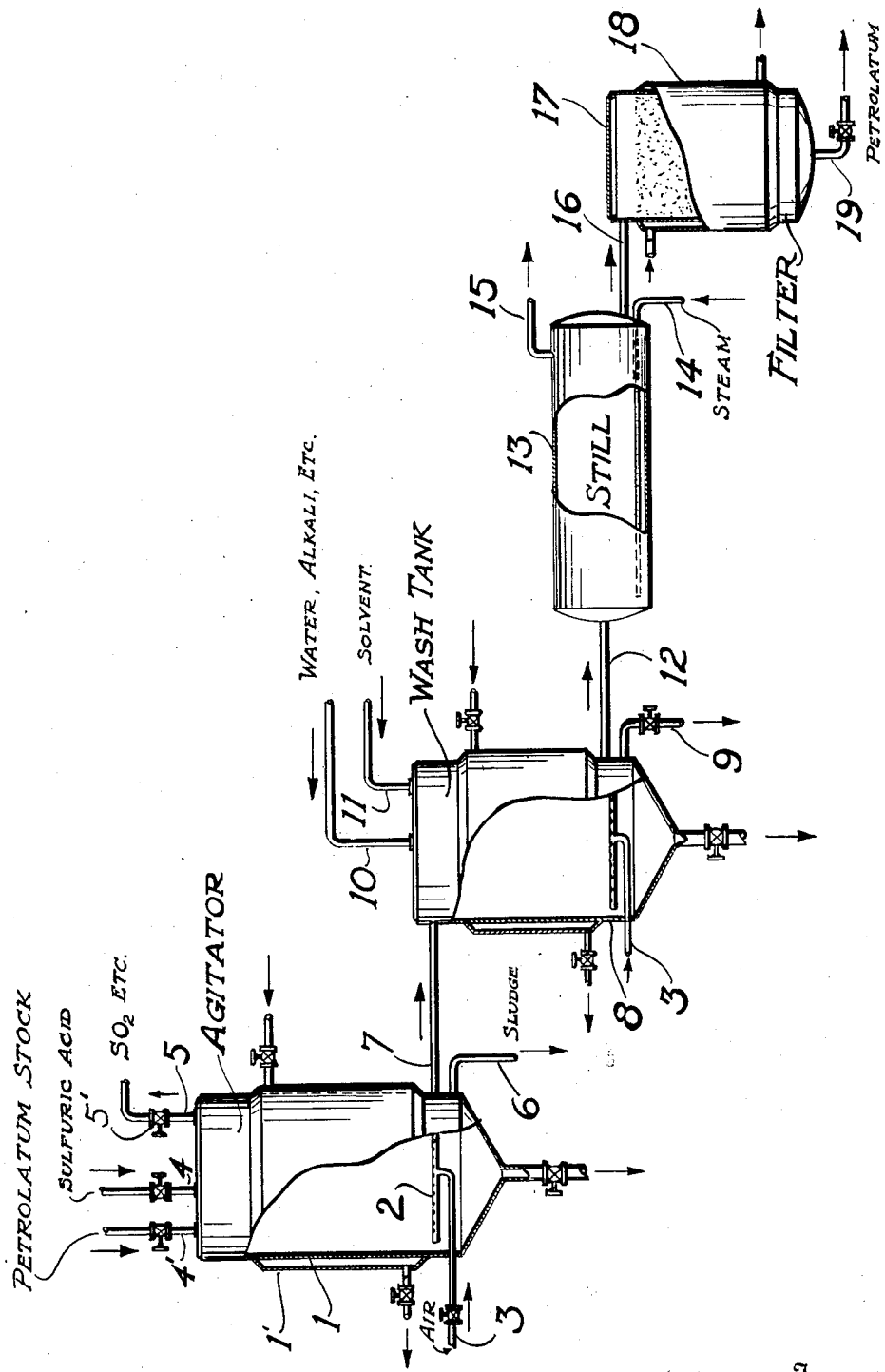

1,791,926

UNITED STATES PATENT OFFICE

HUGH F. GALLAGHER, OF BAYONNE, NEW JERSEY, ASSIGNOR TO STANDARD OIL DEVELOPMENT COMPANY, A CORPORATION OF DELAWARE

PROCESS OF MAKING WHITE PETROLATUM

Application filed October 27, 1925. Serial No. 65,075.

This invention relates to improvements in processes for preparing petrolatum, and the like, by acid treatment of suitable petrolatum-yielding material. I have found that in treating such materials with fuming sulfuric acid, especially blends of crude petrolatum with certain heavy, normally liquid hydrocarbons, the sludge formed tends to remain in suspension and makes recovery of the petrolatum difficult. In accordance with my invention, the sludge is caused to separate readily by the addition to the reaction mixture of a suitable precipitating or settling agent. This agent may be preformed or produced during the reaction.

This and other novel features of the invention will be fully understood from the following description, taken in connection with the accompanying drawing, in which the figure is a diagrammatic side elevation of apparatus for carrying out the process.

Referring to the drawing, reference numeral 1 denotes an agitator tank provided with a distributing head 2 for the introduction of air or other fluid supplied through pipe 3. Mechanical agitating means may be provided, if desired. A steam jacket 1' or other heating means is arranged about the agitator tank. A pipe 4 serves for the introduction of acid. A pipe 4' conveys the petrolatum-yielding material to the tank. This same pipe, or some other inlet, may be used for supplying the precipitant for the sludge. Gases (sulfur dioxid, etc.) evolved in the reaction are conducted away through pipe 5. A valve 5' which may be used to regulate pressure, is installed in pipe 5. A pipe 6 serves for the withdrawal of sludge from the tank, and a pipe 7 for the transfer of the reaction product to a wash tank 8, having a draw-off pipe 9. Water, alkali solution, or other washing agent, may be introduced through pipe 10, and a solvent for sulfonic bodies through pipe 11, to the wash tank 8. From this tank, pipe 12 conveys the petrolatum, residual blending oil, and associated substances, to the still 13, into which steam may be introduced through pipe 14. A vapor line 15 leads from the still to a suitable vapor recovery apparatus (not shown). The product from the still is passed through a pipe 16 to a filter 17 charged with clay or the like and maintained at a suitable temperature by a steam jacket 18, or other heating means. The filtered product is drawn off through a pipe 19.

The following example is illustrative of an embodiment of my invention in which the sludge precipitant is formed in the reaction: About 25% by volume of crude petrolatum is blended or mixed with about 37.5% of 40% bottoms from Cotton Valley crude, or other asphalt-containing petroleum, and about 37.5% of lubricating oil distillate. This stock is treated in the agitator tank 1 with about 50% by volume of fuming sulfuric acid. The acid may be added in one batch or in successive portions. The temperature of the reaction ordinarily ranges between about 60° to 90° C. Cooling means may be provided for use in case the temperature begins to rise too high, say above 120° C. Agitation may be effected if desired by air blowing or otherwise.

By reaction with the acid, the asphaltic bodies in the crude oil form a heavy, readily-settling sludge which carries down with it the sludge compounds formed from the petrolatum and the blending oil. It will be understood that the proportions of hydrocarbon stocks and of acid may be varied considerably. For example, some or all of the blending oil (which usually forms a non-settling sludge in admixture with crude petrolatum) may be replaced in some cases by a stock that forms a readily settling sludge. The blending oil used in this example is the lubricating oil distillate, above referred to. However, other suitable blending agents may be used.

The treated product is removed from the tank 1 and passed into the wash tank 8, in which it is treated with a neutralizing agent such as dilute aqueous caustic soda, and then with a solvent such as a dilute aqueous alcohol, for example 50% isopropyl alcohol, capable of dissolving sulfonic bodies formed in the reaction. Ethyl alcohol or other solvent for sulfonic bodies may be used. Agitation by air blowing or mechanical stirrers may be provided in the wash tank. The neutralized and washed product is forwarded to the steam still 13 in which residual alcohol is removed and may be recovered in any suitable way.

When a blending oil of the type described is used, ordinarily about 50% of it remains in the petrolatum product. This is desirable, because otherwise the product might be too stiff for general commercial use. The residual oil, like the petrolatum, is a very pure hyrocarbon material, owing to the rigorous acid treatment to which it has been subjected. The blending oil may be added, or may exist naturally in the petrolatum stock.

The following procedure may be adopted when a preformed sludge is to be added as the precipitating agent: Crude petrolatum and a heavy oil distillate, for example a distillate of about 600 to 1000 seconds Saybolt viscosity at 100° C., are mixed in about equal proportions by weight and are treated in the agitator tank 1 with about 50% by volume of fuming sulfuric acid. Temperature control may be provided as above described. After all of the acid has been added, the reaction mixture is blown with air for about a half hour. Then a sludge such as is produced by the treating of white oil distillates with fuming sulfuric acid, is added in amount of about 30% by volume of the reaction mixture. Blowing is then resumed and continued for about an hour. In this way the added sludge is thoroughly mixed with other contents of the agitator.

After the blowing is completed, the mixture is allowed to stand for several hours. The temperature is regulated to keep the stock in liquid phase, and an easily removable sludge separates out. The sludge is removed and the residue in the tank is blown to free it from any residual acid fumes. Washing and extraction may be performed as described in connection with the first example.

Various decolorizing materials may be used in the filtration step, but I have generally obtained best results with finely divided clay. The filter should be maintained at a temperature sufficiently high to keep the petrolatum in a freely flowing condition. The product coming from the filter during the first part of the operation is ordinarily pure white, but as the filter becomes less efficient, a progressively darker color appears. The stream flowing from the filter is interrupted as desired to secure various grades of petrolatum.

The sulfur dioxid evolved during the reaction may be absorbed in caustic to form various compounds, or it may be liquefied or otherwise suitably recovered. The solvent used in the wash tank will also be recovered for return to the process.

While I have illustrated a system primarily adapted for batch operation, the process may readily be made continuous by providing a plurality of agitators and wash tanks. The process may be satisfactorily conducted at atmospheric pressure; but higher or lower pressures are not precluded.

The highly purified petrolatum product obtained is characterized by substantial absence of coloration, taste, and odor. It is stable even after long exposure to light and air and is not substantially affected by acids and alkalis under ordinary conditions. Treatment with 95–98% sulfuric acid at temperatures up to 100° C. does not darken the petrolatum or associated oil to any substantial degree.

Where "adding a readily settling sludge," or similar expression, is used herein, it is to be understood that both the addition of a preformed sludge and a sludge formed in situ are included.

The procedures described are illustrative of preferred forms of the invention, but various modifications may be made within the scope of the appended claims, in which it is my intention to claim all novelty inherent in the invention as broadly as the prior art permits.

I claim:

1. Process of preparing petrolatum comprising reacting with fuming sulfuric acid upon a petrolatum-yielding material in the presence of a heavy, normally liquid hydrocarbon to obtain a liquid reaction product containing suspended sludge, adding to such product a readily-settling sludge, whereby the suspended sludge is precipitated, withdrawing the sludges, and treating the residual reaction mixture for the recovery of the petrolatum.

2. Process of preparing petrolatum comprising reacting with fuming sulfuric acid upon crude petrolatum blended with a heavy, normally liquid hydrocarbon, whereby a difficulty separable sludge is produced, adding to the reaction mixture a sludge characterized by ready settling, agitating the mixture, allowing to settle, taking off the added sludge and the reaction sludge precipitated thereby, and treating the reaction mixture for the recovery of the petrolatum.

3. Process according to claim 2, in which the reaction mixture and the added sludge are agitated by air blowing.

4. Process according to claim 2, in which the crude petrolatum is blended with about an equal volume of a heavy oil distillate.

5. Process according to claim 2, in which the reaction mixture after separation of sludge is neutralized, washed with a solvent for sulfonic bodies, and steamed.

6. Process according to claim 2, in which the reaction mixture after separation of the sludge is successively washed, steamed, and filtered through a finely divided decolorizing material.

7. The process of preparing a petrolatum composition, which comprises reacting with an excess of fuming sulfuric acid upon a mixture of crude petrolatum-yielding material and an oil which forms a readily settling sludge, separating the resulting sludge, and recovering petrolatum composition.

8. The process of preparing a petrolatum composition, which comprises reacting with an excess of fuming sulfuric acid upon a mixture of crude petrolatum-yielding material and asphalt-containing petroleum, separating the resulting sludge, and recovering petrolatum composition.

9. The process of preparing a petrolatum composition, which comprises reacting with an excess of fuming sulfuric acid upon a mixture of crude petrolatum-yielding material, blending oil and sufficient asphalt-containing oil to form substantial amounts of readily settling sludge, separating the resulting sludge, and recovering petrolatum composition.

HUGH F. GALLAGHER.